(12) United States Patent
You et al.

(10) Patent No.: US 9,215,060 B2
(45) Date of Patent: Dec. 15, 2015

(54) COMMUNICATION METHOD FOR USER EQUIPMENT AND USER EQUIPMENT, AND COMMUNICATION METHOD FOR BASE STATION AND BASE STATION

(71) Applicant: LG ELECTRONICS INC., Seoul (KR)

(72) Inventors: Hyangsun You, Anyang-si (KR); Yunjung Yi, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,315

(22) PCT Filed: Feb. 21, 2013

(86) PCT No.: PCT/KR2013/001379
§ 371 (c)(1),
(2) Date: Aug. 21, 2014

(87) PCT Pub. No.: WO2013/125871
PCT Pub. Date: Aug. 29, 2013

(65) Prior Publication Data
US 2015/0030090 A1    Jan. 29, 2015

Related U.S. Application Data

(60) Provisional application No. 61/601,550, filed on Feb. 21, 2012.

(51) Int. Cl.
*H04K 1/10*    (2006.01)
*H04L 5/16*    (2006.01)
(Continued)

(52) U.S. Cl.
CPC    *H04L 5/16* (2013.01); *H04L 5/003* (2013.01); *H04L 5/14* (2013.01); *H04L 27/2602* (2013.01)

(58) Field of Classification Search
CPC ............. H04L 5/14; H04L 5/16; H04L 5/003; H04L 5/2602; H04W 72/14
USPC ................. 375/260, 265, 267, 277, 285, 295; 370/281, 436, 465, 522
See application file for complete search history.

(56) References Cited

U.S. PATENT DOCUMENTS

2010/0273506 A1* 10/2010 Stern-Berkowitz ... G01S 5/0009
455/456.1
2011/0032850 A1* 2/2011 Cai ........................ H04L 5/0023
370/280

(Continued)

FOREIGN PATENT DOCUMENTS

| WO | 2010/049587 | 5/2010 |
|---|---|---|
| WO | 2010/148086 | 12/2010 |
| WO | 2011/127435 | 10/2011 |

OTHER PUBLICATIONS

PCT International Application No. PCT/KR2013/001379, Written Opinion of the International Searching Authority dated Jun. 3, 2013, 1 page.

(Continued)

*Primary Examiner* — Khanh C Tran
(74) *Attorney, Agent, or Firm* — Lee, Hong, Degerman, Kang & Waimey

(57) ABSTRACT

The present invention relates to subframe configuration information for half duplex frequency duplex (HD-FDD) or time division duplex (TDD). The subframe configuration indicates which of a predefined plurality of continuous subframes is a subframe for downlink reception, which of the plurality of contiguous subframes is a subframe for uplink transmission, or which of the plurality of contiguous subframes is a special subframe that includes at least one OFDM symbol for the downlink reception and at least one OFDM symbol for the uplink transmission.

14 Claims, 15 Drawing Sheets

(51) Int. Cl.
*H04L 5/14* (2006.01)
*H04L 5/00* (2006.01)
*H04L 27/26* (2006.01)

(56) References Cited

U.S. PATENT DOCUMENTS

| | | | |
|---|---|---|---|
| 2011/0044188 A1* | 2/2011 | Luo | H04L 27/2607 370/252 |
| 2011/0176461 A1 | 7/2011 | Astely et al. | |
| 2011/0194523 A1 | 8/2011 | Chung et al. | |
| 2011/0268016 A1* | 11/2011 | Youn | H04L 5/0003 370/315 |
| 2013/0188510 A1* | 7/2013 | Siomina | H04W 24/10 370/252 |
| 2015/0043392 A1* | 2/2015 | Susitaival | H04L 5/1469 370/280 |

OTHER PUBLICATIONS

PCT International Application No. PCT/KR2013/001379, Written Opinion of the International Searching Authority dated Jun. 3, 2013, 31 pages.

* cited by examiner

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | | PBCH/SS | | | | | SIB1/SS | | | | | PBCH/SS | | | | | SS | | | | | PBCH/SS | | | | | SIB1/SS | | | | | PBCH/SS | | | | | SS | | | | | |
| 0 ms shift | | D | S | U | U | U | F | D | D | D | S | U | U | U | F | D | D | D | S | U | U | U | F | D | D | D | S | U | U | U | F | D | D | D | S | U | U | U | F | D | D | 2 PBCHs, 1 SIB1, 4 SSs |
| 5 ms shift | | U | U | U | F | D | D | D | S | U | U | U | F | D | D | D | S | U | U | U | F | D | D | D | S | U | U | U | F | D | D | D | S | U | U | U | F | D | D | D | S | 2 PBCHs, 1 SIB1, 4 SSs |
| 10 ms shift | | U | F | D | D | D | S | U | U | U | F | D | D | D | S | U | U | U | F | D | D | D | S | U | U | U | F | D | D | D | S | U | U | U | F | D | D | D | S | U | U | 2 PBCHs, 1 SIB1, 4 SSs |
| 15 ms shift | | S | U | U | U | F | D | D | D | S | U | U | U | F | D | D | D | S | U | U | U | F | D | D | D | S | U | U | U | F | D | D | D | S | U | U | U | F | D | D | D | 2 PBCHs, 1 SIB1, 4 SSs |
| 20 ms shift | | U | F | D | D | D | S | U | U | U | F | D | D | D | S | U | U | U | F | D | D | D | S | U | U | U | F | D | D | D | S | U | U | U | F | D | D | D | S | U | U | 2 PBCHs, 1 SIB1, 4 SSs |
| 25 ms shift | | D | D | D | S | U | U | U | F | D | D | D | S | U | U | U | F | D | D | D | S | U | U | U | F | D | D | D | S | U | U | U | F | D | D | D | S | U | U | U | F | 2 PBCHs, 1 SIB1, 4 SSs |
| 30 ms shift | | U | U | U | F | D | D | D | S | U | U | U | F | D | D | D | S | U | U | U | F | D | D | D | S | U | U | U | F | D | D | D | S | U | U | U | F | D | D | D | S | 2 PBCHs, 1 SIB1, 4 SSs |
| 35 ms shift | | F | D | D | D | S | U | U | U | F | D | D | D | S | U | U | U | F | D | D | D | S | U | U | U | F | D | D | D | S | U | U | U | F | D | D | D | S | U | U | U | 2 PBCHs, 1 SIB1, 4 SSs |

< 3 HARQ subframe sets >

| Bits | Subframe pattern number |
|------|-------------------------|
| 00   | Subframe pattern 0      |
| 01   | Subframe pattern 1      |
| 10   | Subframe pattern 2      |
| 11   | Subframe pattern 3      |

COMMUNICATION METHOD FOR USER EQUIPMENT AND USER EQUIPMENT, AND COMMUNICATION METHOD FOR BASE STATION AND BASE STATION

CROSS-REFERENCE TO RELATED APPLICATIONS

This application is the National Stage filing under 35 U.S.C. of 371 of International Application No. PCT/KR 2013/001379, filed on Feb. 21, 2013, which claims the benefit of U.S. Provisional App. Ser. No. 61/601,550, filed on Feb. 21, 2012, the contents of which hereby incorporated by reference herein in their entirety.

TECHNICAL FIELD

The present invention relates to a communication method and apparatus in a wireless communication system. More particularly, the present invention relates a communication method and apparatus using half duplex frequency division duplex (HD-FDD) or time division duplex (TDD).

BACKGROUND ART

In a wireless communication system, some standards for a physical (PHY) layer define a structured data sequence having a fixed duration called a frame or radio frame, for communication between a user equipment (UE) and an evolved node B (eNB). One frame may include a predetermined number of time resource units. A time resource unit is referred to as a subframe or slot. One subframe/slot may be configured to include a plurality of orthogonal frequency division multiplexing (OFDM) symbols in the time domain. For example, one subframe may be configured by one or more slots each including a plurality of OFDM symbols. The number of subframes per frame, the number of slots per subframe, and the number of OFDM symbols per slot are determined according to physical standards of the system.

FIG. 1 schematically illustrates three duplex schemes used in bidirectional radio communication.

Uplink (UL)/downlink (DL) configuration in a frame varies with a duplexing scheme. Duplex refers to bidirectional communication between two devices, distinguished from simplex indicating unidirectional communication. In bidirectional communication, transmission on bidirectional links may occur at the same time (full-duplex) or at separate times (half-duplex).

Referring to FIG. 1, a full-duplex transceiver is used to separate two communication links of opposite directions in the frequency domain. That is, different carrier frequencies are adopted in respective link directions. Duplex using different carrier frequencies in respective link directions is referred to as frequency division duplex (FDD). Conversely, a half-duplex transceiver is used to separate two communication links of opposite directions in the time domain. Referring to FIG. 1, duplex using the same carrier frequency in respective link directions is referred to as time division duplex (TDD). Referring to FIG. 1, the half-duplex transceiver may use different carrier frequencies in respective link directions and this is referred to as half duplex FDD (HD-FDD). In HD-FDD, communication of opposite directions for a specific device occurs not only on different carrier frequencies but also at different timings. Therefore, HD-FDD is regarded as a hybrid of FDD and TDD.

Since transmission and reception cannot be simultaneously performed in HD-FDD and TDD, a time resource for transmission and a time resource for reception need to be properly distributed.

DETAILED DESCRIPTION OF THE INVENTION

Technical Problems

The present invention proposes a method for appropriately distributing a time resource for DL and a time resource for UL, for duplex incapable of simultaneously performing transmission and reception.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for performing communication with a base station by a user equipment in a wireless communication system, including receiving subframe configuration information for half duplex frequency division duplex (hereinafter, HD-FDD); and performing uplink (UL) transmission or downlink (DL) reception using the subframe configuration information, wherein the subframe configuration information indicates whether any subframe among a predefined number of successive subframes is a subframe for DL reception (hereinafter, 'D'), a subframe for UL transmission (hereinafter, 'U'), or a special subframe (hereinafter, 'S') including at least one orthogonal frequency division multiplexing (OFDM) symbol for DL reception and at least one OFDM symbol for UL transmission.

In another aspect of the present invention, provided herein is a user equipment for performing communication with a base station in a wireless communication system, including a radio frequency (RF) unit; and a processor configured to control the RF unit, wherein the processor is configured to control the RF unit to receive subframe configuration information for half duplex frequency division duplex (hereinafter, HD-FDD) and control the RF unit to perform uplink (UL) transmission or downlink (DL) reception using the subframe configuration information, and wherein the subframe configuration information indicates whether any subframe among a predefined number of successive subframes is a subframe for DL reception (hereinafter, 'D'), a subframe for UL transmission (hereinafter, 'U'), or a special subframe (hereinafter, 'S') including at least one orthogonal frequency division multiplexing (OFDM) symbol for DL reception and at least one OFDM symbol for UL transmission.

In another aspect of the present invention, provided herein is a method for performing communication with a user equipment by a base station in a wireless communication system, including transmitting subframe configuration information for half duplex frequency division duplex (hereinafter, HD-FDD); and performing uplink (UL) reception or downlink (DL) transmission using the subframe configuration information, wherein the subframe configuration information indicates whether any subframe among a predefined number of successive subframes is a subframe for DL transmission (hereinafter, 'D'), a subframe for UL reception (hereinafter, 'U'), or a special subframe (hereinafter, 'S') including at least one orthogonal frequency division multiplexing (OFDM) symbol for DL transmission and at least one OFDM symbol for UL reception.

In another aspect of the present invention, provided herein is a base station for performing communication with a user equipment in a wireless communication system, including a radio frequency (RF) unit; and a processor configured to control the RF unit, wherein the processor is configured to control the RF unit to transmit subframe configuration information for half duplex frequency division duplex (hereinafter, HD-FDD); and control the RF unit to perform uplink (UL) reception or downlink (DL) transmission using the subframe configuration information, and wherein the subframe configuration information indicates whether any subframe among a predefined number of successive subframes is a subframe for DL transmission (hereinafter, 'D'), a subframe for UL reception (hereinafter, 'U'), or a special subframe (hereinafter, 'S') including at least one orthogonal frequency division multiplexing (OFDM) symbol for DL transmission and at least one OFDM symbol for UL reception.

In each aspect of the present invention, the successive subframes may be configured to include at least one 'n' satisfying the condition that an 'n+8k'-th (where k=0, 1, 2, 3, ... ) subframe among the successive subframes is 'D' and an 'n+8k+4'-th subframe among the successive subframes is 'U'.

In each aspect of the present invention, the successive subframes may be configured to include one or more '5*m'-th (where m is an integer) subframes usable as 'D' or 'S'.

In each aspect of the present invention, the successive subframes may include at least one pattern configured by a subframe of 'D', successive subframes of 'F/S' (where the 'F/S' is used as one of 'D', 'U', and 'S'), and a subframe of 'U'.

In each aspect of the present invention, one of the successive subframes of 'F/S' may be used as 'S', a subframe located before the one subframe used as 'S' among the successive subframes may be used as 'D', and a subframe located after the one subframe used as 'S' among the successive subframes may be used as 'U'.

In each aspect of the present invention, the successive subframes may include 40 subframes configured according to one of patterns obtained by cyclic-shifting a pattern of 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', and 'F/S' by an integer multiple of 5 (where 'F/S' is a subframe used as one of 'D', 'U', and 'S' and 'F' is a subframe used as one of 'D' and 'U').

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a time resource for DL and a time resource for UL can be appropriately distributed for duplex incapable of simultaneously performing transmission and reception.

According to the present invention, signaling overhead for allocation of a time resource for UL and a time resource for DL can be reduced.

According to the present invention, scheduling complexity in an eNB can be reduced.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 7 illustrates subframe patterns according to the present invention.

FIGS. 9 to 13 illustrate cyclic-shifted forms of subframe patterns of the present invention.

MODE FOR INVENTION

Figure 1:
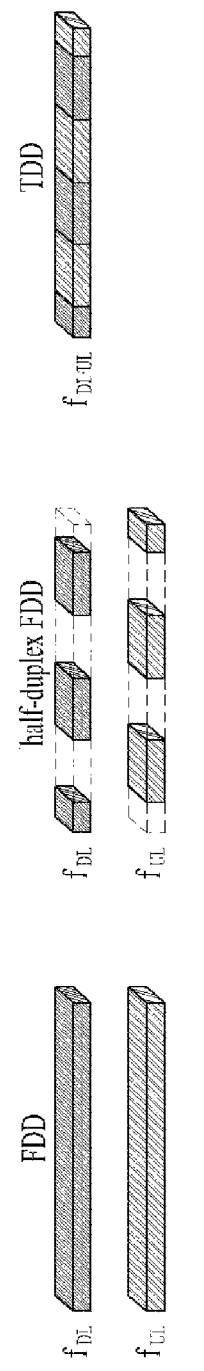
FIG. 1 schematically illustrates three duplex schemes used in bidirectional radios communication.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio link. At least one antenna is installed per node. The antenna may mean a physical antenna, an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE/LTE-A based system, the UE may measure a downlink channel state from a specific node using channel state information-reference signal(s) (CSI-RS(s)) transmitted on a CSI-RS resource allocated to the specific node by antenna port(s) of the specific node. Meanwhile, a 3GPP LTE/LTE-A system uses the concept of a cell in order to manage radio resources and a cell associated with the radio resources is distinguished from a cell of a geographic region.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Figure 2:
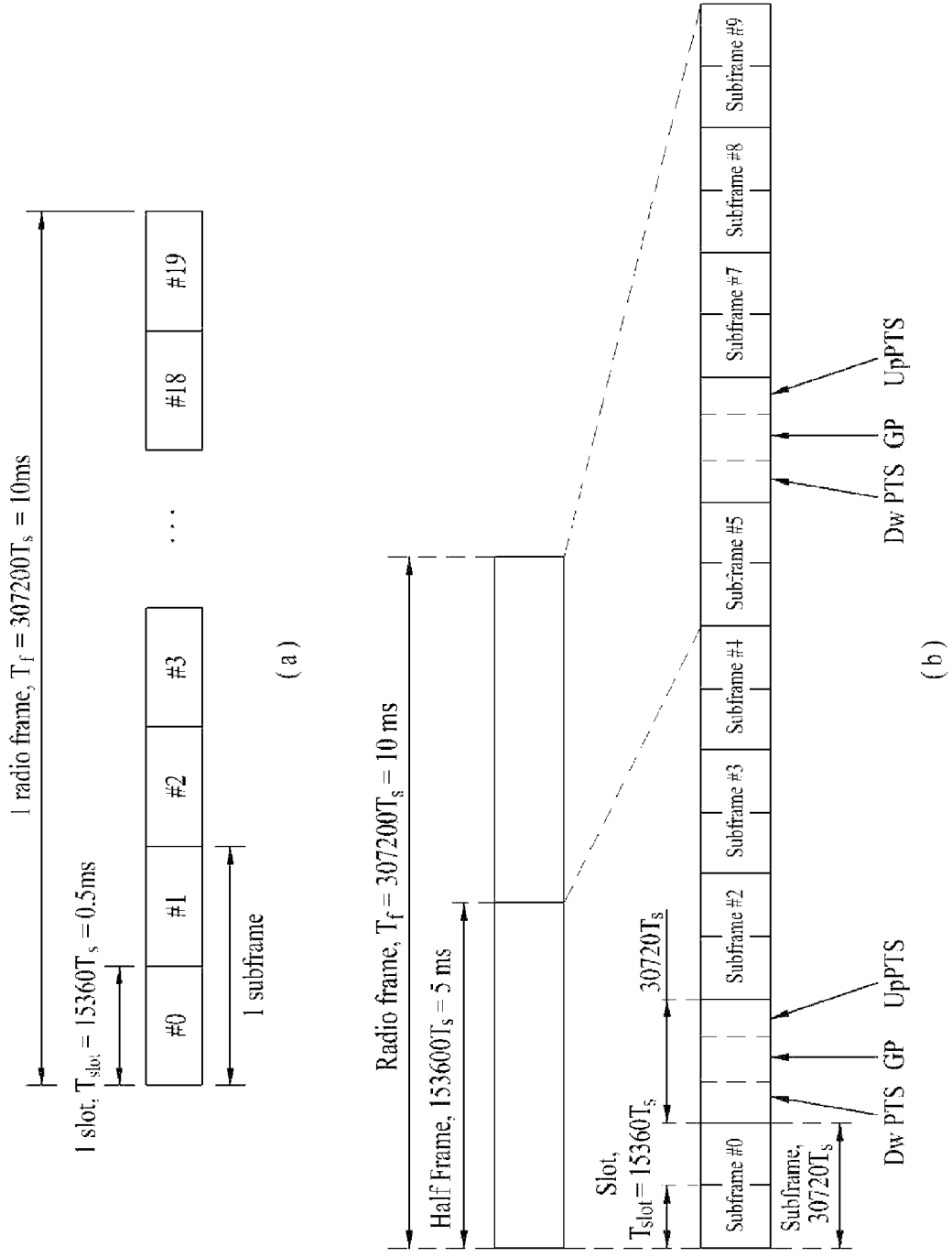
FIG. 2 illustrates the structure of a radio frame used in a wireless communication system.

FIG. 2 illustrates the structure of a radio frame used in a wireless communication system.

Specifically, FIG. 2(a) illustrates an exemplary structure of a radio frame which can be used in frequency division multiplexing (FDD) in 3GPP LTE/LTE-A and FIG. 2(b) illustrates an exemplary structure of a radio frame which can be used in time division multiplexing (TDD) in 3GPP LTE/LTE-A.

Referring to FIG. 2, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Here, $T_s$ denotes sampling time where $T_s=1/(2048*15\ \text{kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

Figure 3:
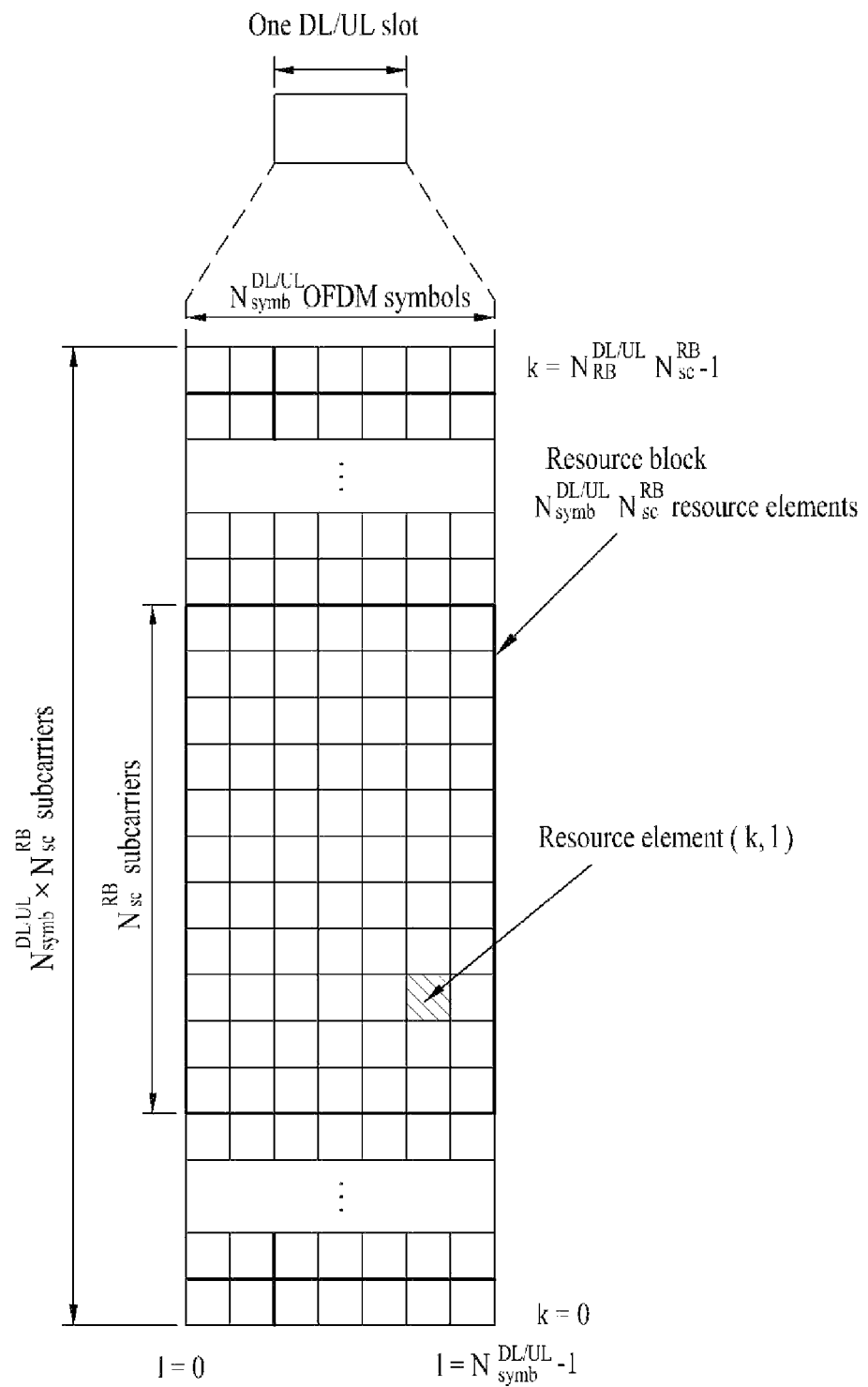
FIG. 3 illustrates the structure of a downlink (DL)/uplink (UL) slot in a wireless communication system.

FIG. 3 illustrates the structure of a DL/UL slot structure in a wireless communication system. In particular, FIG. 3 illustrates the structure of a resource grid of a 3GPP LTE/LTE-A system. One resource grid is defined per antenna port.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration.

Referring to FIG. 3, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present invention are similarly applicable to subframes having a different number of OFDM symbols. Referring to FIG. 3, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 4:
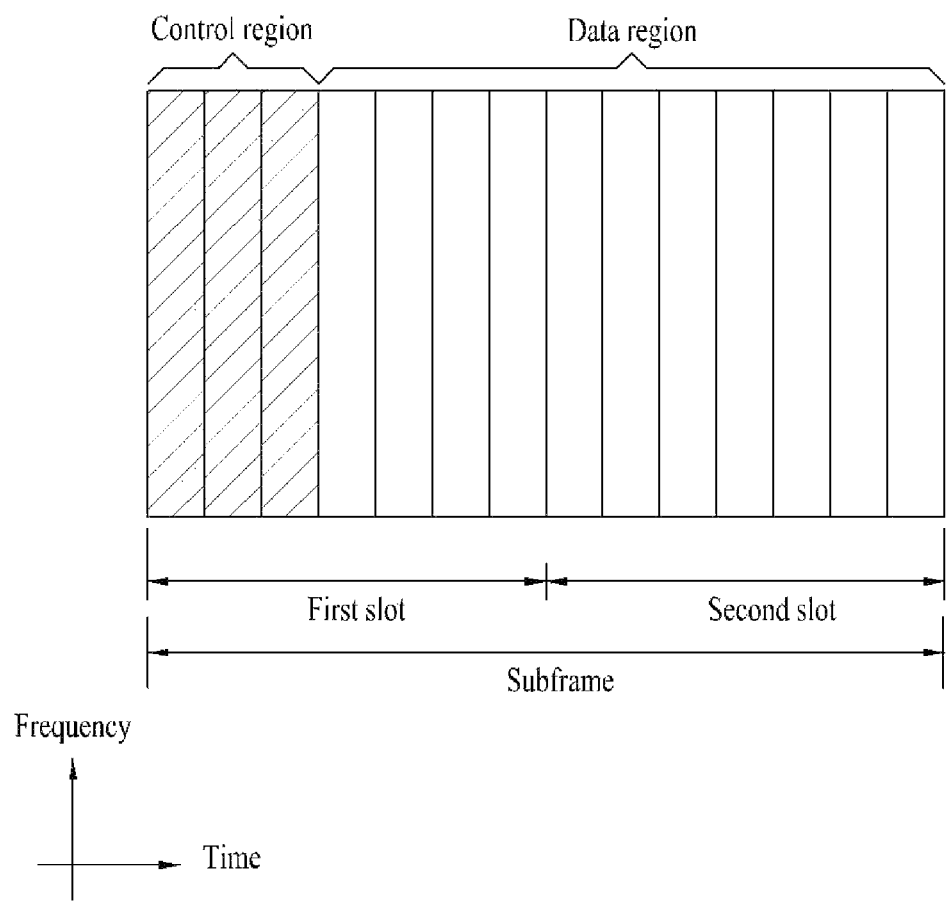
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. A transmit format and resource allocation information of a downlink shared channel (DL-SCH) are referred to as DL scheduling information or DL grant and a transmit format and resource allocation information of an uplink shared channel (UL-SCH) are referred to as UL scheduling information or UL grant. DCI carried by one PDCCH may differ in size and use according to DCI format and differ in size according to coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 5:
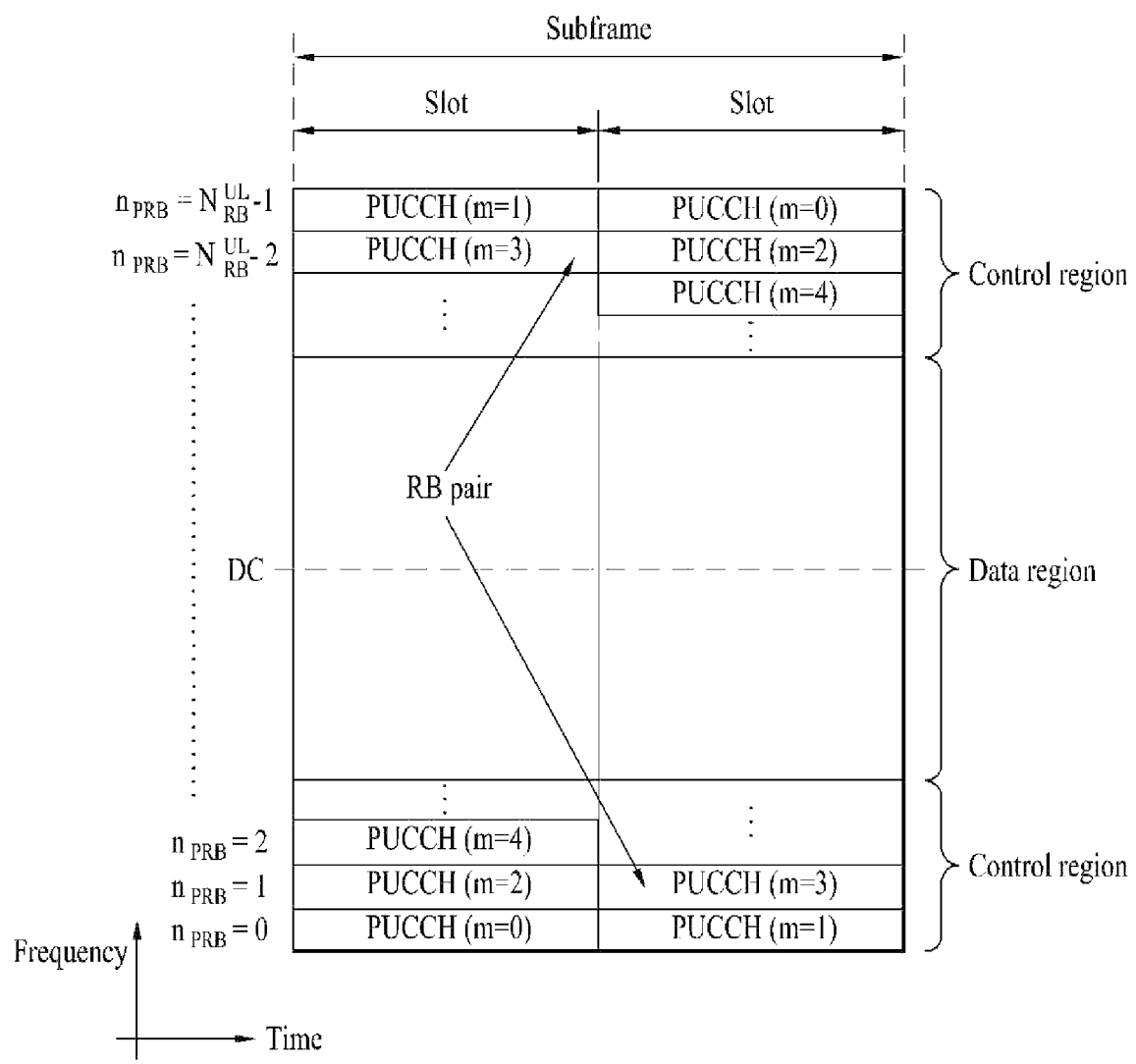
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Various devices and techniques requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, carrier aggregation (CA) technology which efficiently uses more frequency bands, cognitive ratio technology, multiple input and multiple output (MIMO) technology for increasing data capacity in a restricted frequency, multiple-eNB cooperative technology, etc. have been highlighted. In addition, communication environments have evolved such that the density of accessible nodes is increased in the vicinity of a UE. A communication system including high-density nodes may provide a higher performance communication service to the UE by cooperation between nodes. According to the introduction of new radio communication technology, not only the number of UEs to which a node should provide a service in a predetermined resource region but also the amount of UL data and UL control information that the node should receive from the service-provided UEs is increasing. Since the amount of radio resources available for communication between the node and the UEs is finite, a new method for efficiently allocating UL/DL radio resources is needed.

For example, a beyond 3GPP LTE-A system considers configuring a low-cost/low-end UE based on data communication such as meter reading, water level measurement, use of a surveillance camera, and inventory reporting of a vending machine. Such a UE is referred to as a machine type communication (MTC) UE for convenience. Since the MTC UE transmits less data and intermittently transmits and receives UL/DL data, it is efficient to lower costs of the MTC UE and reduce battery consumption according to low data transmission rate. Particularly, costs of the MTC UE can be lowered and battery consumption can be reduced by lowering operating frequency bandwidth of the MTC UE and thus remarkably reducing radio frequency (RF)/baseband complexity of the MTC UE. The present invention proposes using HD-FDD for MTC UEs. The present invention described below is applicable not only to MTC UEs but also to UEs using normal HD-FDD. When using HD-FDD, a UE only needs to perform transmission and reception while switching between RF frequencies through one RF unit. Therefore, the UE may be manufactured at low cost relative to a UE using FDD which requires two RF units.

In LTE/LTE-A defined up to now, a scheduling scheme for HD-FDD has been determined Accordingly, an eNB manages scheduling of all UEs using HD-FDD. However, when many UEs are connected to the eNB, the eNB has difficulty in processing scheduling of UEs using HD-FDD as in a conventional scheme. Therefore, it is necessary to restrict subframe scheduling of HD-FDD to some degree. The present invention proposes efficient use of HD-FDD in an LTE system by restricting subframe patterns for UEs using HD-FDD. Hereinbelow, subframe patterns for efficiently performing HD-FDD in an LTE/LTE-A system are proposed. The UEs using HD-FDD may perform communication with the eNB using one of the subframe patterns proposed below.

Subframe patterns according to the present invention are proposed in consideration of the following factors so that HD-FDD may be used in an existing FDD environment.

UL Synchronous HARQ Timing

Currently, many communication systems use an automatic repeat request (ARQ) scheme and a more developed type of hybrid ARQ (HARQ) scheme as a transmission/reception error control method. In both the ARQ scheme and the HARQ scheme, a transmitting side awaits an ACK signal after transmitting data (e.g. transport blocks or codewords). A receiving side transmits the ACK signal only upon correctly receiving the data and transmits a NACK signal upon occurrence of an error in the received data. The transmitting side transmits data upon receiving the ACK signal but retransmits the data upon receiving the NACK signal. The ARQ scheme and the HARQ scheme differ in error processing methods employed upon occurrence of error data. In the ARQ scheme, the error data is deleted from a buffer of the receiving side and is not used in a subsequent process. On the other hand, in the HARQ scheme, the error data is stored in a HARQ buffer and is combined with next retransmission data in order to raise a reception success rate.

In the case of a 3GPP LTE(-A) system, a radio link control (RLC) layer performs error control using the ARQ scheme and a medium access control (MAC)/PHY layer performs error control using the HARQ scheme. The HARQ scheme may be divided into synchronous HARQ and asynchronous HARQ according to retransmission timing. Synchronous HARQ is a scheme of performing retransmission at a timing determined by a system when initial transmission is not successful. For example, assuming that retransmission is performed in every X-th (e.g. X=4) time unit (e.g. a TTI or a subframe) after failure of initial transmission, an eNB and a UE do not need to exchange information about a retransmission timing. Accordingly, upon receiving a NACK message, the transmitting side may retransmit data every fourth time unit until an ACK message is received. On the other hand, a retransmission timing in asynchronous HARQ may be newly scheduled or may be performed through additional signaling. In other words, a retransmission timing for error data may differ according to various factors such as channel state. In current 3GPP LTE(-A), the asynchronous HARQ scheme is used in DL and the synchronous HARQ scheme is used in UL.

Figure 6:
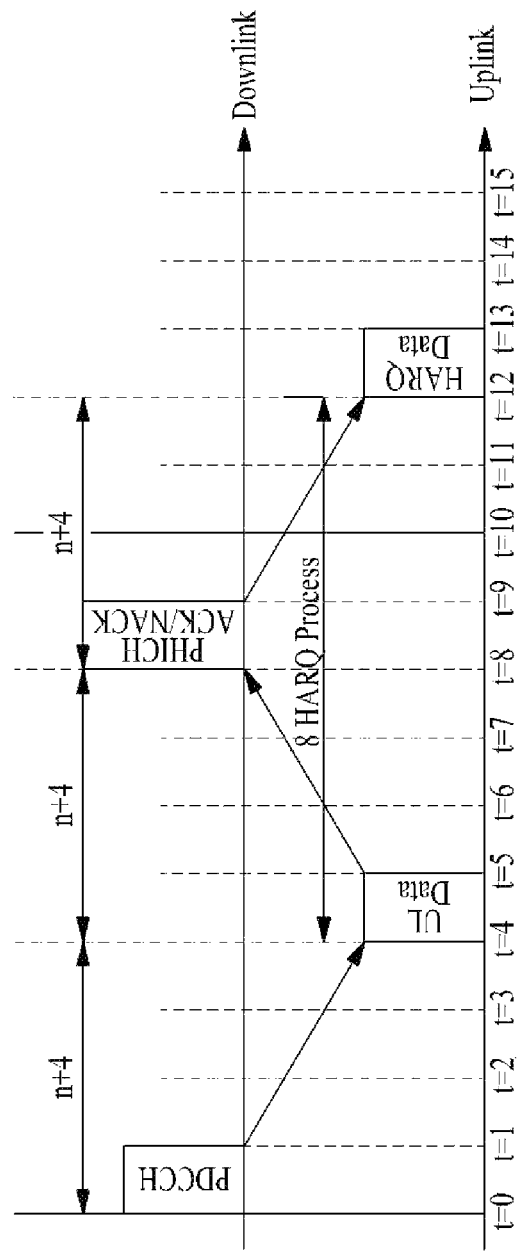
FIG. 6 illustrates resource allocation and retransmission processes of a synchronous UL hybrid automatic retransmission request (HARQ) scheme.

FIG. 6 illustrates resource allocation and retransmission processes of a synchronous UL HARQ scheme.

Referring to FIG. 6, upon receiving a PDCCH carrying scheduling information at t=0 in DL, a UE transmits UL data corresponding to the scheduling information in UL at t=4 after four subframes from a timing at which the PDCCH is detected. The UE expects to receive a PHICH carrying ACK/NACK for the UL data at t=8 after four subframes from the transmission timing of the UL data. Upon receiving NACK, the UE retransmits the UL data, that is, transmits HARQ data, at t=12 after four subframes from the timing at which the PHICH is detected.

Referring to FIG. 6, a time delay occurs until the UE transmits the UL data, receives ACK/NACK for the UL data, and transmits retransmission data after receiving the scheduling information. Such a time delay occurs due to a channel propagation delay and a time required for data decoding/encoding. Therefore, in the case in which the UE transmits new data after a current HARQ process is ended, there is a gap in data transmission due to the time delay. To prevent the gap in data transmission during a time delay duration, a plurality of independent HARQ processes is used. For example, if a gap between initial transmission and retransmission is 7 subframes, data transmission may be performed by carrying out 7 independent HARQ processes without any gap. A plurality of parallel HARQ processes causes the transmitting side to successively perform UL/DL transmission while the transmitting side awaits HARQ feedback for previous UL/DL transmission. Each HARQ process is associated with a HARQ buffer of a MAC layer. Each HARQ process manages status parameters such as the number of transmissions of a MAC physical data unit (PDU) in a buffer, HARQ feedback for the MAC PDU in the buffer, and a current redundancy version.

More specifically, in the case of FDD in 3GPP LTE/LTE-A when a MIMO operation is not performed, 8 UL HARQ processes per carrier configured for the UE are allocated. Accordingly, in order to operate the UE using HD-FDD even in a system according to FDD of legacy 3GPP LTE/LTE-A, a subframe pattern in which an 'n+8k'-th subframe (where k=0, 1, 2, 3, . . . ) corresponds to DL and an 'n+8k+4'-th subframe corresponds to UL is needed to perform synchronous HARQ.

For example, a subframe pattern of the present invention is configured to include at least one n satisfying the condition that an 'n+8k'-th subframe is used as DL and an 'n+8k+4'-th subframe is used for UL, for an arbitrary k (where k=0, 1, 2, 3, . . . ,) when N subframes constituting the subframe pattern are numbered '0' to 'N−1'. In other words, the subframe pattern of the present invention is configured to include at least one n satisfying the condition that an '(n+8k) mod N'-th subframe is used for DL and an '(n+8k+4) mod N'-th subframe is used as UL for an arbitrary k when the subframe pattern includes N subframes numbered '0' to 'N−1'.

DL Guarantee of Specific Subframe

The subframe pattern of the present invention is configured such that a specific subframe in which the following signals are transmitted may be used for DL in an HD-FDD environment.

Synchronous signal (SS): The SS is used when a UE performs an initial cell search procedure such as acquisition of time and frequency synchronization with a cell and detection of a physical cell identity of the cell. The SS is transmitted in 0th, 5th, 10th, 15th, 20th, 25th, 30th, and 35th subframes among 40 subframes during a time duration of 40 ms, that is, a time duration corresponding to four radio frames.

PBCH: The PBCH is a set of time-frequency resources carrying a master information block (MIB) including most frequently transmitted parameters, which is essential when the UE performs initial access to a network of an eNB. The MIB includes a DL system bandwidth (DL BW), PHICH configuration, and a system frame number (SFN). Accordingly, the UE may be explicitly aware of information about the DL BW, SFN, and PHICH configuration by receiving the PBCH. The UE may also be implicitly aware of the number of DL transmit antenna ports by receiving the PBCH. This is because a 16-bit cyclic redundancy check (CRC) to which a sequence corresponding to the number of DL transmit antennas is masked (e.g. XOR-ed) is applied to the PBCH and is transmitted for error detection of the PBCH. The PBCH is transmitted in 0th, 10th, 20th, and 30th subframes during a time duration of 40 ms.

System information block type 1 (SIB1): SIB1 includes not only information about time domain scheduling of other system information blocks (SIBs) but also parameters necessary for determining whether a specific cell is appropriate for cell selection. SIB1 is transmitted in 5th and 25th subframes during a time duration of 40 ms.

Paging signal: The paging signal is transmitted in a specific subframe determined by the eNB.

The UE may perform DL reception only in some of subframes for transmission of the SS, PBCH, SIB1, or paging signal within the range of not hindering data communication. The present invention proposes fixing all or some of subframes for transmitting the SS, PBCH, or SIB1 as subframes for DL in HD-FDD so that the UE may perform DL reception in the subframes for transmitting the SS, PBCH, or SIB1. To this end, the present invention proposes a subframe pattern(s) of 40 ms for HD-FDD. The subframe pattern of 40 ms according to the present invention is configured to satisfy at least one of the following 1), 2), and 3) so that DL can be guaranteed in a specific subframe.

1) A subframe pattern in which all or some of 0th, 5th, 10th, 15th, 20th, 25th, 30th, and 35th subframes are fixed to DL subframes or usable as DL subframes 2) A subframe pattern in which all or some of 0th, 10th, 20th, and 30th subframes, all or some of 5th and 25th subframes, or all or some of 0th, 5th, 10th, 15th, 20th, 25th, 30th, and 35th subframes are fixed to DL subframes or usable as DL subframes 3) A subframe pattern in which 1) and 2) are cyclically shifted For example, the subframe pattern of the present invention may be configured such that all or some of '5*m'-th (where m is an integer) subframes among a predefined number of plural subframes constituting a plurality of successive radio frames are fixed to DL or set to 'F' or 'F/S' which has the probability of being used as DL so that the SS, PBCH, or SIB1 may be transmitted/received at least once.

Guard Time for DL->UL Configuration

As in TDD using the frame structure shown in FIG. 2(b), while a UE performs DL reception in one subframe, it is impossible to perform UL transmission in the immediately following subframe even in HD-FDD. The UE operating in HD-FDD or TDD needs to connect an internal signal processing path to a receiver at a DL reception timing for DL reception and connect the internal signal processing path to a transmitter at a UL transmission timing for UL transmission. However, even when the eNB performs DL transmission at a specific timing, the UE may receive DL transmission at a timing later than the specific timing due to a propagation delay. Accordingly, when the UE operating in DL reception mode in HD-FDD switches to UL transmission mode, sufficient time is required to adjust the frequency of an RF unit from DL frequency to UL frequency. In the case of switching from UL to DL, even when a subframe used as UL is adjacent to a subframe used as DL, since DL transmission transmitted by the eNB in the DL subframe is received by the UE not at a timing immediately after an end timing of the UL subframe but at a timing after a prescribed time due to the propagation delay, a gap is formed between UL transmission and DL reception. Accordingly, a guard timing for switching from UL to DL is not an indispensable element in a frame structure to be applied to HD-FDD.

Therefore, the subframe pattern of the present invention is configured to guarantee a guard time between a subframe for DL and a subframe for UL in order to stably transmit/receive data during switching from DL to UL. The guard time is determined in consideration of a switching time for switching an operating frequency from DL frequency to UL frequency and a propagation time.

The subframe pattern of the present invention configured in consideration of the above description will be described in more detail. Hereinafter, 'U', 'D', 'S', 'F', and 'F/S', used in each drawing and the description, have the following meaning.

U: UL Subframe
Subframe for UL
D: DL Subframe
Subframe for DL
S: Special Subframe The special subframe is a subframe having a guard time for switching from DL to UL. Some DL OFDM symbol(s) for DL transmission/reception of a PDCCH, a PHICH, and a PCFICH and OFDM symbol(s) for UL transmission/reception may be configured in the special subframe.

F: Flexible subframe

The flexible subframe is a subframe which can be used for DL or UL. When the flexible subframe is used for DL, the flexible subframe may be used as 1) a normal DL subframe, 2) a DL subframe in which UL grant for a corresponding UE cannot be transmitted, 3) a DL subframe in which a PDSCH for a corresponding UE cannot be transmitted, or 4) a DL subframe in which a UL grant and a PDSCH for a corresponding UE cannot be transmitted. Alternatively, the flexible subframe may be designated as a subframe which is not used for a corresponding UE. The flexible subframe may also be used for normal UL transmission/reception. An eNB may determine use of the flexible subframe according to situation. The eNB may inform the UE of determined use of the flexible subframe. If it is not determined by the eNB for which subframe the flexible subframe should be used, it is necessary to determine an operation mode of the UE. When it is not determined for which subframe the flexible subframe should be used, a default mode of the UE may be determined such that the UE regards the flexible subframe as a DL subframe and operates in the DL subframe. Alternatively, when it is not determined for which subframe the flexible subframe should be used, the default mode of the UE may be determined such that the UE regards the flexible subframe as a UL subframe and operates in the UL subframe.

F/S: Flexible subframe or special subframe

The F/S subframe may be used as the above-described flexible subframe or special subframe. In other words, a subframe expressed as 'F/S' may be used as one of a DL subframe, a UL subframe, and a special subframe. The eNB may determine whether the F/S subframe is to be used as a flexible subframe or a special subframe according to situation. The eNB may inform the UE of use of 'F/S'.

Particularly, when multiple 'F/S's are consecutively located after 'D' and before 'U', one of 'F/S's is used as a special subframe according to the present invention. In this case, 'F/S'(s), which are consecutively located before the 'F/S' used as the special subframe, may be used for DL and 'F/S'(s), which are consecutively located after 'F/S' used as the special subframe, may be used for UL.

<40 Ms-Subframe Pattern>

A 40 ms-subframe pattern described hereinbelow may be applied to 40 subframes corresponding to a time duration of 40 ms or may be applied to 40 subframes in four consecutive radio frames.

Figure 7:
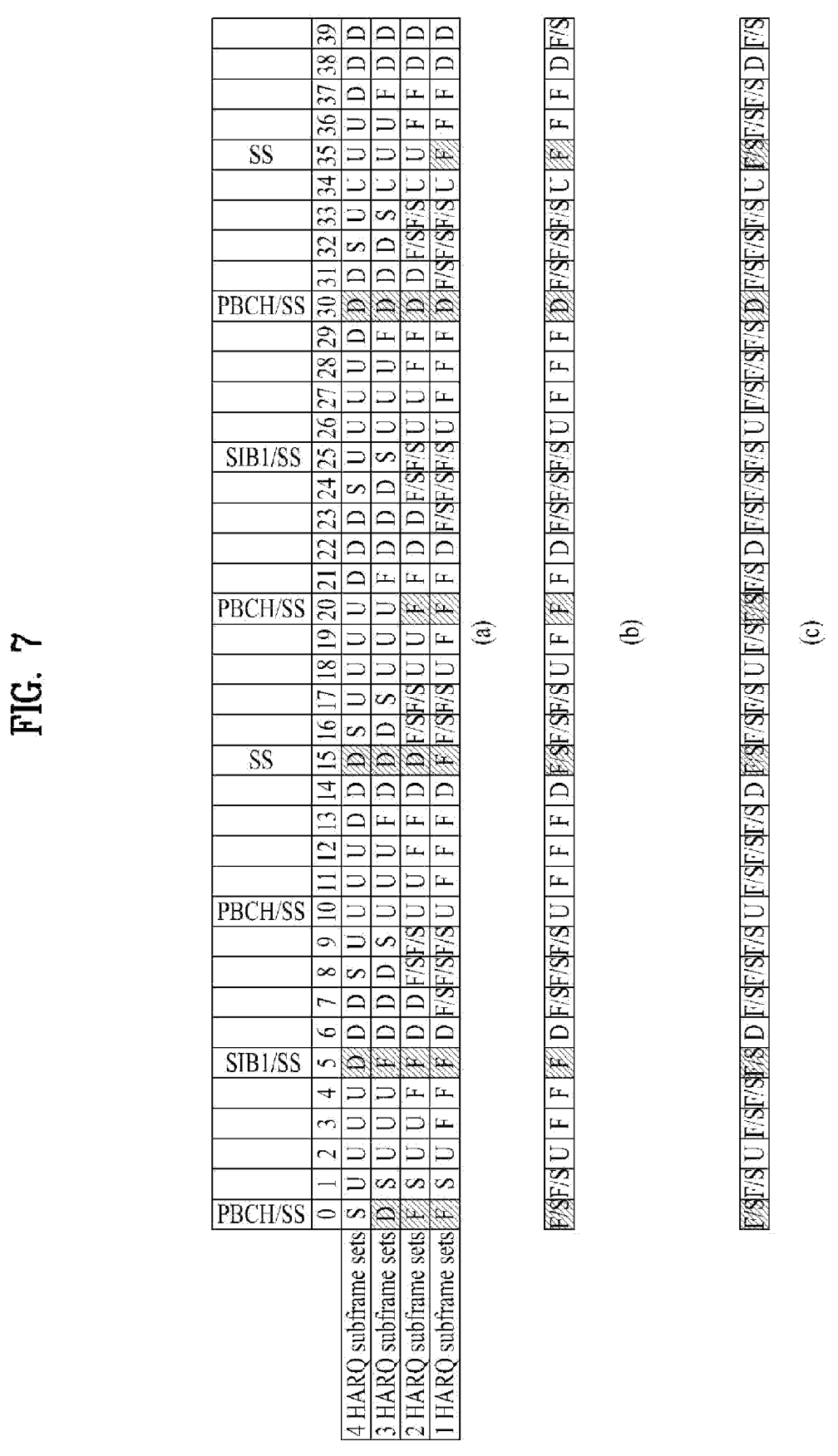

FIG. 7 illustrates subframe patterns according to the present invention. More specifically, FIG. 7 illustrates subframe patterns for 40 subframes. In FIG. 7, hatched subframes may be used for DL subframes to receive at least one of a PBCH, an SIB1, and an SS. For reference, since each of 'F' and 'F/S' may be used as 'D', 'F' and 'F/S' correspond to subframes which may be used by the UE for reception of the PBCH, SIB1 or SS.

For the UE using HD-FDD, any one of the subframe patterns illustrated in FIG. 7 may be repeatedly used at a period of 40 ms. In FIG. 7, a HARQ subframe set means a set of subframes in which an 'n+8k'-th subframe is used for DL and an 'n+8k+4'-th subframe is used for UL, for k=0, 1, 2, 3, . . . , to perform the synchronous HARQ process illustrated in FIG. 6. For example, for a specific n among 40 subframes, assuming that an 'n+8*0'-th subframe is DL, an 'n+8*0+4'-th subframe is UL, an 'n+8*1'-th subframe is DL, an 'n+8*1+4'-th subframe is UL, an 'n+8*2'-th subframe is DL, an 'n+8*2+4'-th subframe is UL, an 'n+8*3'-th subframe is DL, an 'n+8*3+4'-th subframe is UL, an 'n+8*4'-th subframe is DL, and an 'n+8*4+4'-th subframe is UL, 'n+8*0'-th, 'n+8*0+4'-th, 'n+8*1'-th, 'n+8*1+4'-th, 'n+8*2'-th, 'n+8*2+4'-th, 'n+8*3'-th, and 'n+8*3+4'-th subframes may form one HARQ set for the specific n. The number of values of n in which the condition that an 'n+8*0'-th subframe is DL, an 'n+8*0+4'-th subframe is UL, an 'n+8*1'-th subframe is DL, an 'n+8*1+4'-th subframe is UL, an 'n+8*2'-th subframe is DL, an 'n+8*2+4'-th subframe is UL, an 'n+8*3'-th subframe is DL, an 'n+8*3+4'-th subframe is UL, an 'n+8*4'-th subframe is DL, and an 'n+8*4+4'-th subframe is UL is satisfied is the number of HARQ subframe sets guaranteed in the 40 ms-subframe pattern.

FIG. 7(a) illustrates subframe patterns guaranteeing four HARQ subframe sets, three HARQ subframe sets, two HARQ subframe sets, and one HARQ subframe set. For convenience of description, it is assumed that 40 subframes are sequentially numbered 0 to 39.

Among the 40 ms-subframe patterns illustrated in FIG. 7(a), a subframe pattern corresponding to four HARQ subframe sets includes three HARQ subframe sets capable of guaranteeing a synchronous HARQ timing, in which an 'n+8k'-th subframe is DL and an 'n+8k+4'-th subframe is UL for k=0, 1, 2, 3, . . . . In addition, for k=0, 1, 2, 3, . . . , there is one HARQ subframe set capable of guaranteeing a synchronous HARQ timing, in which an 'n+8k'-th subframe is a special subframe and an 'n+8k+4'-th subframe is UL. The special subframe includes a DL symbol for transmitting/receiving a PDCCH or a PHICH. In this case, the UE may receive a PBCH, an SIB1, and an SS through three subframes during a time duration of 40 ms.

Among the 40 ms-subframe patterns illustrated in FIG. 7(a), a subframe pattern corresponding to three HARQ subframe sets includes three HARQ subframe sets capable of guaranteeing a synchronous HARQ timing, in which an 'n+8k'-th subframe is DL and an 'n+8k+4'-th subframe is UL for k=0, 1, 2, 3, . . . . In the subframe pattern guaranteeing three HARQ subframe sets among the patterns of FIG. 7(a), a subframe pattern configured as D-S-U appears five times and a subframe pattern configured as U-F-D appears five times, during a time duration of 40 ms. An eNB may determine whether each flexible subframe will be used as a DL subframe or a UL subframe or whether the flexible subframe will not be used and inform a UE of use of the corresponding flexible subframe(s). Referring to FIG. 7(a), flexible subframes corresponding to 0th, 5th, 10th, 15th, 20th, 25th, 30th, and 35th subframes may be used for transmission/reception of the PBCH, SIB1, or SS. In this case, the eNB may transmit the PBCH, SIB1, and/or SS through three DL subframes and one flexible subframe during a time duration of 40 ms and the UE may transmit PBCH, SIB1, and/or SS.

Among the 40 ms-subframe patterns illustrated in FIG. 7(a), a subframe pattern corresponding to two HARQ subframe sets includes two HARQ subframe sets capable of guaranteeing a synchronous HARQ timing, in which an 'n+8k'-th subframe is DL and an 'n+8k+4'-th subframe is UL for k=0, 1, 2, 3, . . . . In the subframe pattern guaranteeing two HARQ subframe sets among the patterns of FIG. 7(a), a subframe pattern of D-F/S-F/S-U or D-F-S-U appears five times during a time duration of 40 ms. One subframe of 'F/S's of D-F/S-F/S-U is used as a special subframe for switching from DL to UL. The other 'F/S' of 'F/S's of D-F/S-F/S-U, which is not used as the special subframe, is used as a flexible subframe. A flexible subframe located after 'F/S' used as the special subframe out of 'F/S's of D-F/S-F/S-U is used as a UL subframe or as an unused subframe. In addition, a flexible subframe located before 'F/S' used as the special subframe is used as a DL subframe or an unused subframe. In other words, 'F/S'(s) located before a subframe allocated or configured as the special subframe out of 'F/S's of D-F/S-F/S-U is used for DL or is not used for communication between the UE and the eNB and 'F/S'(s) after a subframe allocated or configured as the special subframe out of 'F/S's of D-F/S-F/S-U is used for UL or is not used for communication between the UE and the eNB. Meanwhile, in the subframe pattern guaranteeing two HARQ subframe sets among the patterns of FIG. 7(a), a pattern of U-F-F-D appears five times. In this case, 'F' may be used as a UL subframe, a DL subframe, or an unused subframe. In U-F-F-D, 'F' which is located after 'F' configured to be used for DL, cannot be used for UL. In addition, in U-F-F-D, 'F', which is located before 'F' configured to be used for UL, cannot be used for DL. According to the subframe pattern guaranteeing two HARQ subframe sets among the patterns of FIG. 7(a), the PBCH, SIB1, and SS may be transmitted at least one through two DL subframes and three flexible subframes and may be received by the UE at least once, during a time duration of 40 ms.

Among the 40 ms-subframe patterns illustrated in FIG. 7(a), a subframe pattern corresponding to one HARQ subframe set includes one HARQ subframe set capable of guaranteeing a synchronous HARQ timing, in which an 'n+8k'-th subframe is DL and an 'n+8k+4'-th subframe is UL for k=0, 1, 2, 3, . . . . In the subframe pattern guaranteeing one HARQ subframe set among the patterns of FIG. 7(a), a subframe pattern of D-F-F/S-F/S-F/S-U or D-F-F/S-F/S-F/S-U appears five times during a time duration of 40 ms. One of 'F/S'(s) of D-F-F/S-F/S-F/S-U or D-F-F/S-F/S-F/S-U is used as a special subframe for switching from DL to UL. 'F/S' which is not used as the special subframe out of 'F/S's of D-F-F/S-F/S-F/S-U or D-F-F/S-F/S-F/S-U is used as a flexible subframe. A flexible subframe located after a subframe used as the special subframe out of 'F/S's of D-F/S-F/S-F/S-U or D-F-F/S-F/S-U is used as a UL subframe or an unused subframe A flexible subframe located before a subframe used as the special subframe out of 'F/S's of D-F/S-F/S-F/S-U or D-F-F/S-F/S-U is used as a DL subframe or an unused subframe. In other words, 'F/S'(s) located before a subframe allocated or configured as the special subframe out of 'F/S's of D-F/S-F/S-U or D-F-F/S-F/S-U is used for DL and is not used for communication between the UE and the eNB and 'F/S'(s) after a subframe allocated or configured as a special subframe out of 'F/S's of D-F/S-F/S-U or D-F-F/S-F/S-U is used for UL or is not used for communication between the UE and the eNB. Meanwhile, in the subframe pattern guaranteeing one HARQ subframe set among the patterns of FIG. 7(a), a subframe pattern of U-F-F-F-D appears five times. 'F' may be used as a UL subframe, a DL subframe, or an unused subframe. Among 'F's of U-F-F-F-D, 'F'(s), which is located after 'F' configured to be used for DL, is not used for UL in the present invention and 'F'(s), which is located before 'F' configured to be used for UL, is not used for DL in the present invention. According to the subframe pattern guaranteeing one HARQ subframe set among the patterns of FIG. 7(a), the PBCH, SIB1, and SS may be transmitted at least once through two DL subframes and three flexible subframes during a time duration of 40 ms and may be received by the UE at least once.

The subframe pattern guaranteeing four HARQ subframe sets among the subframe patterns of FIG. 7(a) may be a special case of the subframe pattern guaranteeing three HARQ subframe sets. The subframe pattern guaranteeing four HARQ subframe sets and the subframe pattern guaranteeing three HARQ subframe sets may respectively be a special case of the subframe pattern guaranteeing two HARQ subframe sets. The subframe pattern guaranteeing four HARQ subframe sets, the subframe pattern guaranteeing three HARQ subframe sets, and the subframe pattern guaranteeing two HARQ subframe sets may respectively be a special case of the subframe pattern guaranteeing one HARQ subframe set. For example, the subframe pattern guaranteeing one HARQ subframe set may guarantee a minimum of one HARQ subframe set to a maximum of four subframe sets according to how 'F/S' and 'F' are allocated/configured.

Since 'F/S' may be 'F' or 'S', D-F-F/S-F/S-F/S-U in the subframe pattern guaranteeing one HARQ subframe set of FIG. 7(a) can be another expression of D-F/S-F/S-F/S-U. That is, the subframe pattern guaranteeing one HARQ subframe set among the subframe patterns of FIG. 7(a) may be equal to a subframe pattern of FIG. 7(b). In FIG. 7(a) and FIG. 7(b), a plurality of 'F's located between 'U' and 'F' of U-F-F-F-D are represented by 'F's because a special subframe for switching from 'U' to 'D' is not needed. Therefore, subframes located after 'U' and before 'D' may be expressed as 'F/S' instead of 'F' as in FIG. 7(c). In other words, the subframe pattern guaranteeing one HARQ subframe set in FIG. 7(a) may be only another expression of the subframe pattern of FIG. 7(b) and/or the subframe pattern of FIG. 7(c).

Figure 8:
FIG. 8 illustrates an example of using a subframe pattern of the present invention.

If successive 'F's are configured after 'U' and before 'D' as described above, 'F'(s) after 'F' allocated or configured as DL among the successive 'F's are not used for UL and 'F'(s) before 'F' allocated or configured as DL are not used for DL according to the present invention. For example, in the present invention if 'n+2' subframes are configured by a pattern in which n (where n is an integer larger than 1) successive 'F's are present after 'U' and 'D' is present immediately after the n successive 'F's, the n successive 'F's may be used in the form such that k 'D's are present after (n–k) (where k is an integer satisfying 0≤k≤n) 'U's. In more detail, a pattern of U-F-F-F-D, for example, may be one of:
  i. U-D-D-D-D
  ii. U-U-D-D-D
  iii. U-U-U-D-D
  iv. U-U-U-U-D Meanwhile, if successive 'F/S's are configured after 'D' and before 'U', one of the successive 'F/S's is used as a special subframe, 'F/S'(s) before the special subframe is used for DL, and 'F/S'(s) after the special subframe are used for UL according to the present invention. For example, in the present invention if 'n+2' subframes are configured by a pattern in which n (where n is an integer greater than 1) successive 'F/S's are present after 'D' and 'U' is present immediately after the n successive 'F/S's, the n successive 'F/S's, may be used in the form such that (n–k) (where k is an integer satisfying 0≤k≤n) 'D's, one special subframe, and 'k–1' UL subframes are sequentially connected. For example, a pattern of D-F/S-F/S-F/S-U may be one of:
  i. D-S-U-U-U
  ii. D-D-S-U-U
  iii. D-D-D-S-U For example, the subframe pattern of FIG. 7(b) may be used in the form as illustrated in FIG. 8. That is, FIG. 8 illustrates an example of using a subframe pattern of the present invention.

Referring to FIG. 8, three successive 'F's between 'U' and 'D' may be one of four patterns of D-D-D, U-D-D, U-U-D, and U-U-U and three successive 'F/S's between 'D' and 'U' may be one of three patterns of S-U-U, D-S-U, and D-D-S.

<(Cyclic) shift of subframe pattern>

In the present invention, subframe patterns obtained by cyclic-shifting the subframe patterns according to the number of HARQ subframe sets described with reference to FIG. 7 may be used for subframe patterns for HD-FDD. For example, subframe pattern(s) generated by cyclic-shifting the subframe patterns illustrated in FIG. 7 by 0 ms, 1 ms, 2 ms, 3 ms, 4 ms, 5 ms, 6 ms, and/or 7 ms or subframe pattern(s) generated by cyclic-shifting the subframe patterns illustrated in FIG. 7 by an integer multiple of 5, for example, by 0 ms, 5 ms, 10 ms, 15 ms, 20 ms, 25 ms, 30 ms, and/or 35 ms may be used as 40 ms-subframe patterns.

FIGS. 9 to 13 illustrate cyclic-shifted forms of subframe patterns of the present invention.

Figure 9:
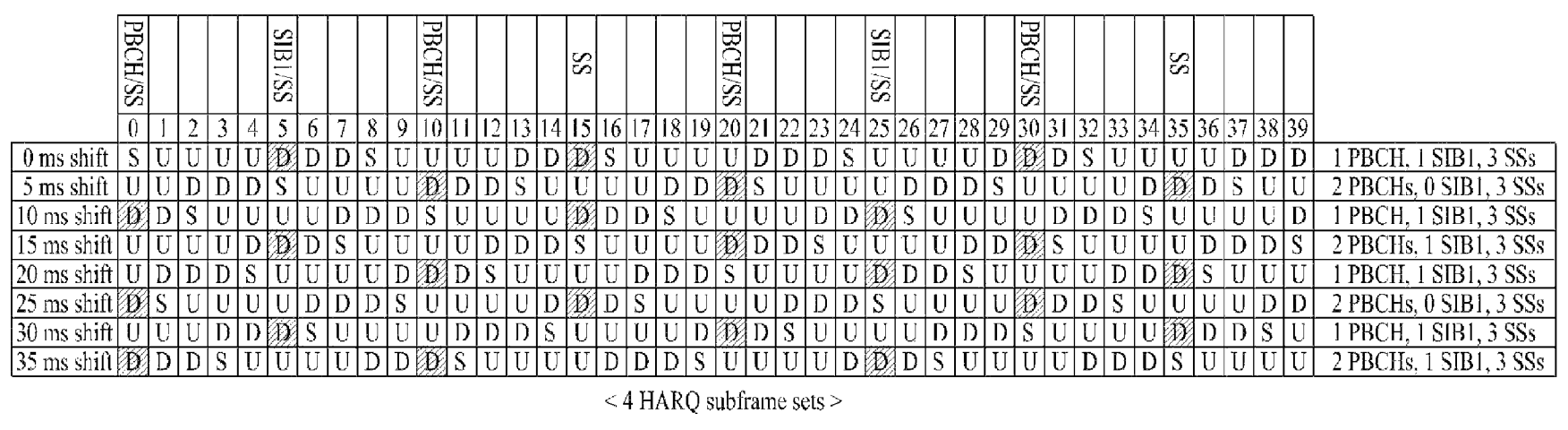
Figure 11:
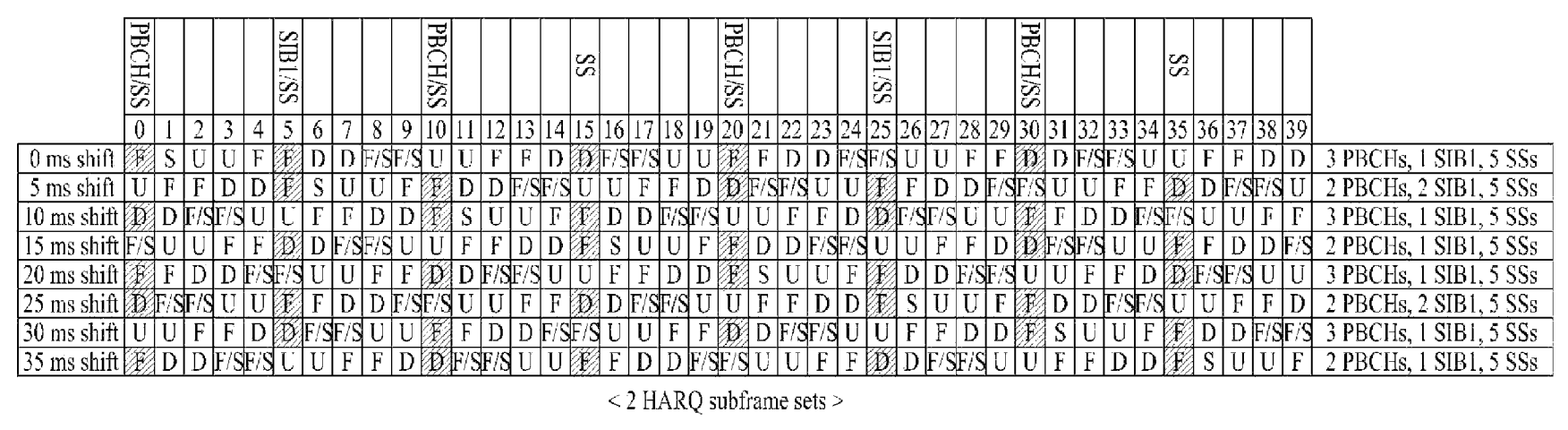
Figure 12:
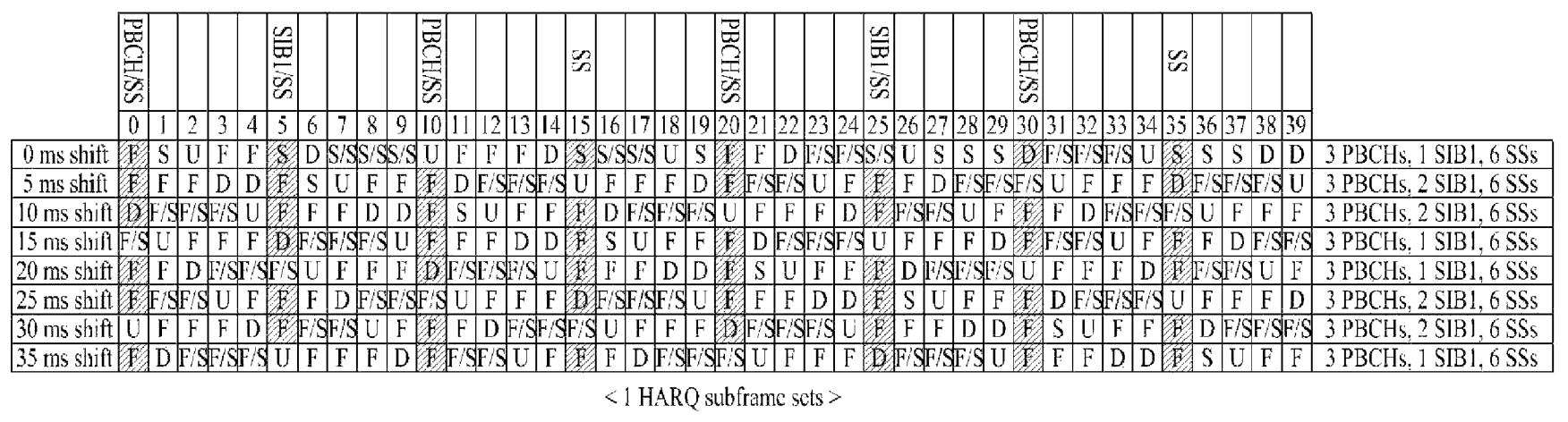
Figure 13:
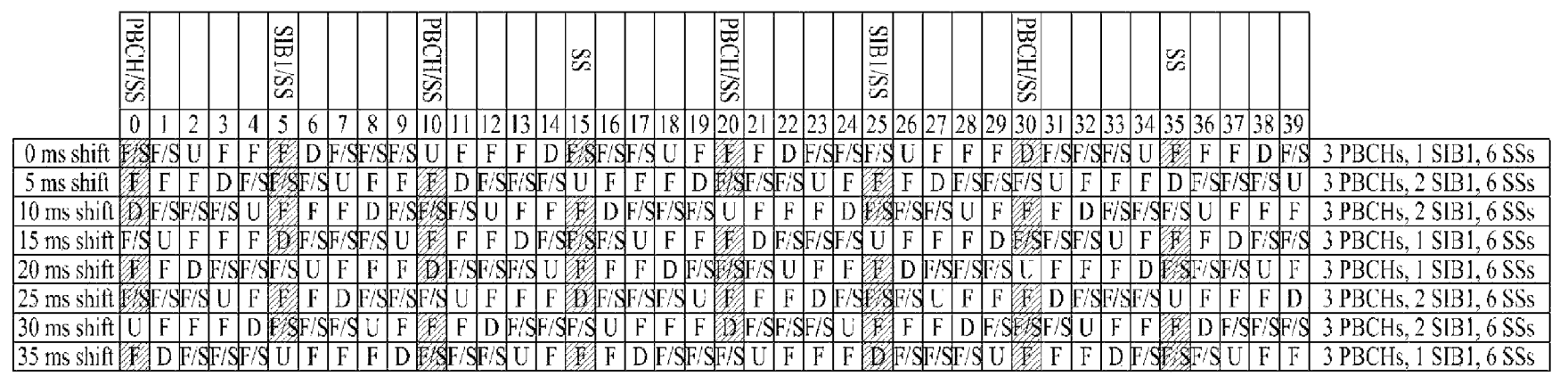

Specifically, FIG. 9 illustrates subframe patterns obtained by shifting a subframe pattern for four HARQ subframe sets among the subframe patterns of FIG. 7(a) by 0 ms, 5 ms, 10 ms, 15 ms, 20 ms, 25 ms, 30 ms, and 35 ms. FIG. 10 illustrates subframe patterns obtained by shifting a subframe pattern for three HARQ subframe sets among the subframe patterns of FIG. 7(a) by 0 ms, 5 ms, 10 ms, 15 ms, 20 ms, 25 ms, 30 ms, and 35 ms. FIG. 11 illustrates subframe patterns obtained by shifting a subframe pattern for two HARQ subframe sets among the subframe patterns of FIG. 7(a) by 0 ms, 5 ms, 10 ms, 15 ms, 20 ms, 25 ms, 30 ms, and 35 ms. FIG. 12 illustrates subframe patterns obtained by shifting a subframe pattern for one HARQ subframe set among the subframe patterns of FIG. 7(a) by 0 ms, 5 ms, 10 ms, 15 ms, 20 ms, 25 ms, 30 ms, and 35 ms. FIG. 13 illustrates subframe patterns obtained by shifting the subframe pattern of FIG. 7(b) by 0 ms, 5 ms, 10 ms, 15 ms, 20 ms, 25 ms, 30 ms, and 35 ms.

In FIGS. 9 to 13, the numbers of PBCHs, SIB1s, and SSs which can be received by a UE with respect to each shifted subframe pattern are denoted. As shown in FIGS. 9 to 13, the number of PBCHs, SIB1s, and SSs which can be received by the UE differ according to a shifted degree of the subframe patterns of FIG. 7.

As described above, predetermined subframe patterns may be used for HD-FDD. The number of subframe patterns available for HD-FDD may be one or plural. An eNB may commonly or individually allocate subframe patterns to UEs operating in HD-FDD. In addition, the eNB may dynamically, semi-statically, or statically allocate the subframe patterns to UEs using HD-FDD or operating in HD-FDD. The eNB may use a part or all of subframe patterns obtained by (cyclic-) shifting the above-described 40 ms-subframe patterns for subframe scheduling of the UEs using HD-FDD and corresponding subframe patterns.

When subframe patterns selected by the eNB are applied to the UEs, the eNB may apply the same subframe pattern to all UEs in a cell managed thereby. Alternatively, the eNB may differently apply the subframe patterns to the UEs to disperse UL or DL communication of the UEs in subframes or may individually apply the subframe patterns to the respective UEs to apply a subframe pattern suitable for each UE according to traffic of the UE or other characteristics.

To guarantee reception of a paging signal by a UE, the eNB considers the location of a subframe in which the paging signal for the UE is transmitted when determining a subframe pattern of the UE or determines the location of a subframe in which the paging signal for the UE is transmitted by considering the subframe pattern of the UE.

The eNB may configure the subframe pattern for the UE using HD-FDD through a higher layer signal (e.g. RRC signaling). In other words, the eNB may configure the subframe pattern for the UE through a higher layer signal.

Figures 14, 15:
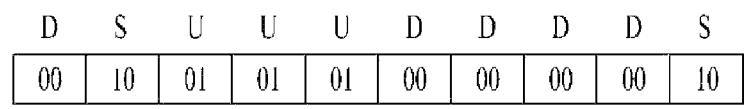
FIGS. 14 to 16 illustrate signaling methods of information indicating a subframe pattern.
Figure 16:
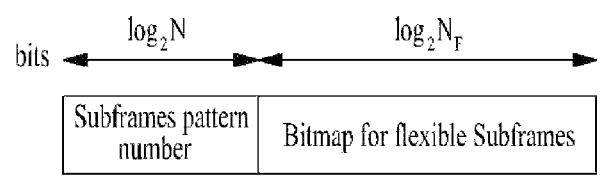

FIGS. 14 to 16 illustrate signaling methods of information indicating a subframe pattern. The subframe pattern may be configured for the UE by the eNB through a higher layer signal using, for example, one of the following methods.

UL-DL Allocation Pattern Indication by Bitmap

A 40 ms-subframe pattern or a subframe pattern for a specific number of subframes may be indicated using a bitmap. For example, assuming that DL is indicated by '00', UL is indicated by '01', and a specific subframe is indicated by '10', referring to FIG. 14, subframe pattern information expressed by 00/10/01/01/01/00/00/00/00/10 may indicate a subframe pattern of D/S/U/U/U/D/D/D/D/S.

Subframe Pattern Number

Subframe patterns available for HD-FDD between the eNB and the UE and numbers assigned to the available subframe patterns may be predetermined. Alternatively, the eNB may determine the available subframe patterns, assign numbers to the subframe patterns, and then inform, in advance, the UE of the available subframe patterns and the pattern numbers. The eNB may configure a subframe pattern of the UE by informing the UE of a number of a subframe pattern to be (actually) used by the UE among the available subframe patterns. For example, referring to FIG. 15 for example, when four subframe patterns are available for HD-FDD, the eNB may configure a subframe pattern to be 9 actually) used by the UE among the four available subframe patterns by transmitting 00 for configuration of the first subframe pattern, 01 for configuration of the second subframe pattern, 10 for configuration of the third subframe pattern, or 11 for configuration of the fourth subframe pattern.

Subframe Pattern Number and Bitmap

The eNB may mixedly use a subframe number and a bitmap to configure a subframe pattern for the UE. The bitmap may be configured by bits corresponding not to subframes fixed to one of 'D', 'U', and 'S' but to subframes usable as 'D', 'U', or 'S' according to situation among subframe patterns, that is, to subframes corresponding to 'F' or 'F/S', one by one.

For example, referring to FIG. 16, information indicating a number of a subframe pattern and information including bitmap information for 'F'(s) in the subframe pattern may be used as subframe pattern configuration information for the UE. If N is the number of available subframe patterns for HD-FDD and $N_F$ is the number of flexible subframes in one subframe pattern among the available subframe patterns, one of the available subframe patterns may be indicated using $\log_2 N$ bits in a subframe pattern number field. Meanwhile, in a bitmap field for a flexible subframe, (actual) use of flexible subframes included in a subframe pattern indicated by a subframe pattern number may be configured. For example, whether flexible subframes will be used for DL or UL may be indicated using one bit per flexible subframe, i.e. using a total of $\log_2 N_F$ bits. For example, a bit corresponding to a flexible subframe used as 'D' among the $\log_2 N_F$ bits is set to '0' and a bit corresponding to a flexible subframe used as 'U' among the $\log_2 N_F$ bits may be set to '1' so that the set bits may be provided to the UE.

As another example, information indicating numbers of subframe patterns and information for 'F/S'(s) among the subframe patterns may be used as subframe pattern configuration information for the UE. Assuming that N is the number of available subframe patterns for HD-FDD and $N_{FS}$ is the number of 'F/S's in one subframe pattern among the available subframe patterns, one of the available subframe patterns may be indicated using $\log_2 N$ bits in a subframe pattern number field. Meanwhile, in a bitmap field for 'F/S', (actual) use of 'F/S's included in a subframe pattern indicated by a subframe pattern number may be configured. For example, whether 'F/S'(s) will be used as 'D', 'U', or 'S' may be indicated using two bits per 'F/S', i.e. using a total of log 2(2$N_{FS}$) bits. As an example, bits corresponding to 'F/S' used as 'D' among the $\log_2(2N_{Fs})$ bits may be set to '00', bits corresponding to 'F/S' used as 'U' may be set to '10', and bits corresponding to 'F/S' used as 'S' may be set to '01' so that the set bits may be provided to the UE. Alternatively, one bit per 'F/S', i.e. a total of $\log_2(N_{FS})$ bits, may be allocated to 'F/S's in a subframe pattern indicated by a subframe pattern number and 'F/S'(s) used as 'S' among the 'F/S's may be indicated by $\log_2(N_{FS})$ bits so that the UE is informed of use of each 'F/S'. For instance, the eNB may set bit(s) corresponding to 'F/S' to be used as 'S' among the $\log_2(N_{FS})$ bits to '1' and set bit(s) corresponding to 'F/S' which are not used for 'S' to '0', thereby transmitting the set bits to the UE. The UE may regard a subframe corresponding to a bit set to '1' among $\log_2(N_{FS})$ bits as 'S', regard 'F/S' located after 'D' and before the 'S' as 'D', and regard 'F/S' located before the 'S' and before 'U' as 'U'.

The eNB may receive a UL signal in a subframe configured as UL, transmit a DL signal in a subframe configured as DL, and transmit a DL signal on an OFDM symbol for DL out of a special subframe, according to a subframe pattern for the UE. The eNB may not perform transmission of the DL signal and reception of the UL signal on an OFDM symbol for a guard time and may receive the UL signal on an OFDM symbol for UL. The UE may transmit the UL signal in a subframe configured as UL and receive the DL signal in a subframe configured as DL, according to a subframe pattern indicated by a higher layer signal from the eNB. The UE may receive the DL signal on an OFDM symbol for DL out of a special subframe and may not perform reception of the DL signal and transmission of the UL signal on an OFDM symbol for a guard time. The UE may transmit the UL signal on an OFDM symbol for UL.

Figure 17:
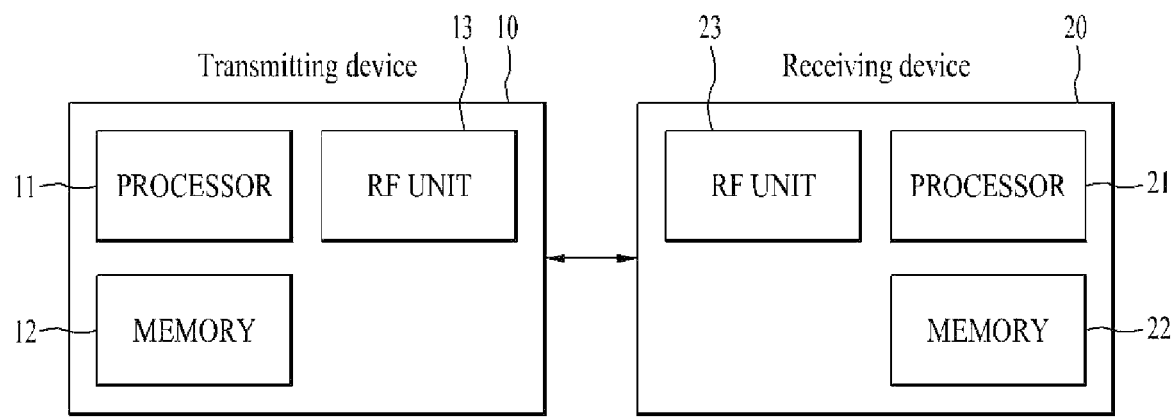
FIG. 17 is a block diagram illustrating elements of a transmitting device 10 and a receiving device 20 for implementing the present invention.

FIG. 17 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

The eNB processor of the present invention controls the eNB RF unit to transmit a bitmap, a subframe pattern number, or a subframe pattern number and a bitmap indicating use of 'F's or 'F/S's in a subframe pattern indicated by the subframe pattern number as UL-DL configuration information. The subframe pattern may be one of the subframe patterns illustrated in FIG. 7 or subframe patterns generated by (cyclic-) shifting the subframe patterns illustrated in FIG. 7 by a predetermined time or by a predetermined number of subframes. The eNB processor may control the eNB RF unit to transmit a DL signal to the UE in a subframe corresponding to a DL subframe according to the subframe pattern indicated by the UL-DL configuration information and control the eNB RF unit to receive a UL signal from the UE in a subframe corresponding to a UL subframe. The eNB processor may control the eNB RF unit to transmit the DL signal on a predetermined number of front OFDM symbols among OFDM symbols in a subframe corresponding a special subframe according to the subframe pattern, control the eNB RF unit not to perform transmission/reception of a signal on a predetermined number of middle OFDM symbols, and control the eNB RF unit to receive the UL signal on a predetermined number of end OFDM symbols.

The UE RF unit may receive the UL-DL configuration information and the UE processor may discern whether any subframe is a UL subframe, a DL subframe, or a special subframe based on the UL-DL configuration information. In other words, the UE processor may control the UE RF unit to perform UL transmission and/or DL reception according to a subframe pattern indicated by the UL-DL configuration information. The UE processor may control the UE RF unit to receive the DL signal in a subframe corresponding to a DL subframe according to the subframe pattern indicated by the UL-DL configuration information and control the UE RF unit to transmit the UL signal in a subframe corresponding to the UL subframe. The UE processor may control the UE RF unit to receive the DL signal on a predetermined number of front OFDM symbols among OFDM symbols in a subframe corresponding a special subframe according to the subframe pattern, control the UE RF unit not to perform transmission/reception of a signal on a predetermined number of middle OFDM symbols, and control the UE RF unit to transmit the UL signal on a predetermined number of end OFDM symbols.

The subframe pattern may be applied to subframes of a number corresponding to the subframe pattern until a new subframe pattern is configured for the UE.

The above-described present invention may be applied not only to UEs using HD-FDD but also to UEs using other duplex in which all time resources are divided into UL and DL in the time domain, that is, to UEs using TDD.

According to the above-described present invention, a regularized frame structure for HD-FDD may be configured while conforming to a legacy communication rule of FDD. Accordingly, UEs configured according to the present invention may operate even in legacy FDD. When the regularized frame structure is defined, since the UE may discern whether a gap for switching from DL to UE in any subframe is needed, the UE may perform a gap operation only in a corresponding subframe and thus transmission/reception complexity of the UE can be reduced.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Industrial Applicability

The embodiments of the present invention are applicable to a base station, a UE, or other devices in a wireless communication system.

The invention claimed is:

1. A method for performing communication with a base station by a user equipment in a wireless communication system, the method comprising:

receiving subframe configuration information for half duplex frequency division duplex (hereinafter, HD-FDD); and performing uplink (UL) transmission or downlink (DL) reception using the subframe configuration information, wherein the subframe configuration information indicates whether any subframe among a predefined number of successive subframes is a subframe for DL reception (hereinafter, 'D'), a subframe for UL transmission (hereinafter, 'U'), or a special subframe (hereinafter, 'S') including at least one orthogonal frequency division multiplexing (OFDM) symbol for DL reception and at least one OFDM symbol for UL transmission.

2. The method according to claim 1, wherein the successive subframes are configured to include at least one 'n' satisfying the condition that an 'n+8k'-th (where k=0, 1, 2, 3, . . .) subframe among the successive subframes is 'D' and an 'n+8k+4'-th subframe among the successive subframes is 'U'.

3. The method according to claim 1, wherein the successive subframes are configured to include one or more '5*m'-th (where m is an integer) subframes usable as 'D' or 'S'.

4. The method according to claim 1, wherein the successive subframes include at least one pattern configured by a subframe of 'D', successive subframes of 'F/S', and a subframe of 'U' and the 'F/S' is used as one of 'D', 'U', and 'S'.

5. The method according to claim 4, wherein one of the successive subframes of 'F/S' is used as 'S', a subframe located before the one subframe used as 'S' among the successive subframes is used as 'D', and a subframe located after the one subframe used as 'S' among the successive subframes is used as 'U'.

6. The method according to claim 1, wherein the successive subframes include 40 subframes configured according to one of patterns obtained by cyclic-shifting a pattern of 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', and 'F/S' by an integer multiple of 5 and wherein 'F/S' is a subframe used as one of 'D', 'U' and 'S', and 'F' is a subframe used as one of 'D' and 'U'.

7. A user equipment for performing communication with a base station in a wireless communication system, the user equipment comprising:
 a radio frequency (RF) unit; and
 a processor configured to control the RF unit,
 wherein the processor is configured to control the RF unit to receive subframe configuration information for half duplex frequency division duplex (hereinafter, HD-FDD) and control the RF unit to perform uplink (UL) transmission or downlink (DL) reception using the subframe configuration information, and
 wherein the subframe configuration information indicates whether any subframe among a predefined number of successive subframes is a subframe for DL reception (hereinafter, 'D'), a subframe for UL transmission (hereinafter, 'U'), or a special subframe (hereinafter, 'S') including at least one orthogonal frequency division multiplexing (OFDM) symbol for DL reception and at least one OFDM symbol for UL transmission.

8. The user equipment according to claim 7, wherein the successive subframes are configured to include at least one 'n' satisfying the condition that an 'n+8k'-th (where k=0, 1, 2, 3, . . .) subframe among the successive subframes is 'D' and an 'n+8k+4'-th subframe among the successive subframes is 'U'.

9. The user equipment according to claim 7, wherein the successive subframes are configured to include one or more '5*m'-th (where m is an integer) subframes usable as 'D' or 'S'.

10. The user equipment according to claim 7, wherein the successive subframes include at least one pattern configured by a subframe of 'D', successive subframes of 'F/S', and a subframe of 'U' and the 'F/S' is used as one of 'D', 'U', and 'S'.

11. The user equipment according to claim 10, wherein one of the successive subframes of 'F/S' is used as 'S', a subframe located before the one subframe used as 'S' among the successive subframes is used as 'D', and a subframe located after the one subframe used as 'S' among the successive subframes is used as 'U'.

12. The user equipment according to claim 7, wherein the successive subframes include 40 subframes configured according to one of patterns obtained by cyclic-shifting a pattern of 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', 'F/S', 'F/S', 'F/S', 'U', 'F', 'F', 'F', 'D', and 'F/S' by an integer multiple of 5 and wherein 'F/S' is a subframe used as one of 'D', 'U' and 'S', and 'F' is a subframe used as one of 'D' and 'U'.

13. A method for performing communication with a user equipment by a base station in a wireless communication system, the method comprising:
 transmitting subframe configuration information for half duplex frequency division duplex (hereinafter, HD-FDD); and
 performing uplink (UL) reception or downlink (DL) transmission using the subframe configuration information,
 wherein the subframe configuration information indicates whether any subframe among a predefined number of successive subframes is a subframe for DL transmission (hereinafter, 'D'), a subframe for UL reception (hereinafter, 'U'), or a special subframe (hereinafter, 'S') including at least one orthogonal frequency division multiplexing (OFDM) symbol for DL transmission and at least one OFDM symbol for UL reception.

14. A base station for performing communication with a user equipment in a wireless communication system, the base station comprising:
 a radio frequency (RF) unit; and
 a processor configured to control the RF unit,
 wherein the processor is configured to control the RF unit to transmit subframe configuration information for half duplex frequency division duplex (hereinafter, HD-FDD); and control the RF unit to perform uplink (UL) reception or downlink (DL) transmission using the subframe configuration information, and
 wherein the subframe configuration information indicates whether any subframe among a predefined number of successive subframes is a subframe for DL transmission (hereinafter, 'D'), a subframe for UL reception (hereinafter, 'U'), or a special subframe (hereinafter, 'S') including at least one orthogonal frequency division multiplexing (OFDM) symbol for DL transmission and at least one OFDM symbol for UL reception.

* * * * *